US008034443B2

(12) United States Patent
Eder

(10) Patent No.: US 8,034,443 B2
(45) Date of Patent: Oct. 11, 2011

(54) PLASTIC COMPOSITE MATERIAL AND METHOD FOR MANUFACTURING SAID MATERIAL

(75) Inventor: Andreas Eder, Vienna (AT)

(73) Assignee: C-Polymers GmbH, Klosterneuburg (AT)

( * ) Notice: Subject to any disclaimer, the term of this patent is extended or adjusted under 35 U.S.C. 154(b) by 488 days.

(21) Appl. No.: 12/232,767

(22) Filed: Sep. 24, 2008

(65) Prior Publication Data

US 2009/0087661 A1   Apr. 2, 2009

(30) Foreign Application Priority Data

Sep. 27, 2007 (DE) .......................... 10 2007 046 614
Oct. 16, 2007 (DE) .......................... 10 2007 049 439

(51) Int. Cl.
B32B 17/12 (2006.01)
(52) U.S. Cl. ..................... 428/293.4; 524/495; 524/496; 428/297.4; 428/299.1

(58) Field of Classification Search ............... 428/295.4, 428/293.4, 297.4, 299.1; 524/496, 495; 423/447.2
See application file for complete search history.

(56) References Cited

U.S. PATENT DOCUMENTS

| 6,683,783 | B1 * | 1/2004 | Smalley et al. ............... 361/502 |
| 7,282,260 | B2 * | 10/2007 | LeGrande et al. ............. 428/323 |
| 7,419,624 | B1 * | 9/2008 | Smalley et al. ............... 252/510 |
| 7,425,604 | B2 * | 9/2008 | Cosman et al. ............... 528/373 |
| 7,566,410 | B2 * | 7/2009 | Song et al. .................... 252/511 |
| 7,709,133 | B2 * | 5/2010 | Evans et al. ................... 429/483 |
| 7,790,285 | B2 * | 9/2010 | Zhamu et al. ................. 428/402 |
| 7,897,248 | B2 * | 3/2011 | Barrera et al. ............. 428/295.4 |
| 2009/0087661 | A1 * | 4/2009 | Eder ............................. 428/406 |
| 2010/0000441 | A1 * | 1/2010 | Jang et al. .................. 106/31.13 |

* cited by examiner

Primary Examiner — N. Edwards
(74) Attorney, Agent, or Firm — Welsh Flaxman & Gitler LLC

(57) ABSTRACT

Plastic composite material made up of a polymer matrix with a concentration of a nanofiber material and with a concentration of graphite-based particles. The matrix additionally contains at least one inorganic filler in the form of silicate-based particles or in the form of glass particles.

23 Claims, 4 Drawing Sheets

PLASTIC COMPOSITE MATERIAL AND METHOD FOR MANUFACTURING SAID MATERIAL

BACKGROUND OF THE INVENTION

The invention relates to a plastic composite material made of a polymer matrix with a concentration of a nanofiber material and graphite based particles. The matrix additionally contains at least one inorganic filler in the form of silicate-based particles.

Various plastic compound materials or plastic composite materials are known in the art that have electrically conductive properties, or are suitable for shielding electromagnetic radiation or waves.

In particular, a plastic composite material is known (US 2005/0049355 A1), which for the purpose of improved mechanical properties and also for improved flame-retardant properties contains nanomaterial in the form of nanotubes and in particular in the form of single-walled or multi-walled nanotubes in a matrix made of a polymer material, the outer diameter of the nanotubes being between 1.2 and 500 nm.

It is an object of the invention is to create a plastic compound material with improved properties.

BRIEF DESCRIPTION OF THE DRAWINGS

An exemplary embodiment of the plastic compound material or plastic composite material is provided by way of further elucidation in the photographs, which were taken using an electron microscope.

DETAILED DESCRIPTION OF THE INVENTION

Figure 1:
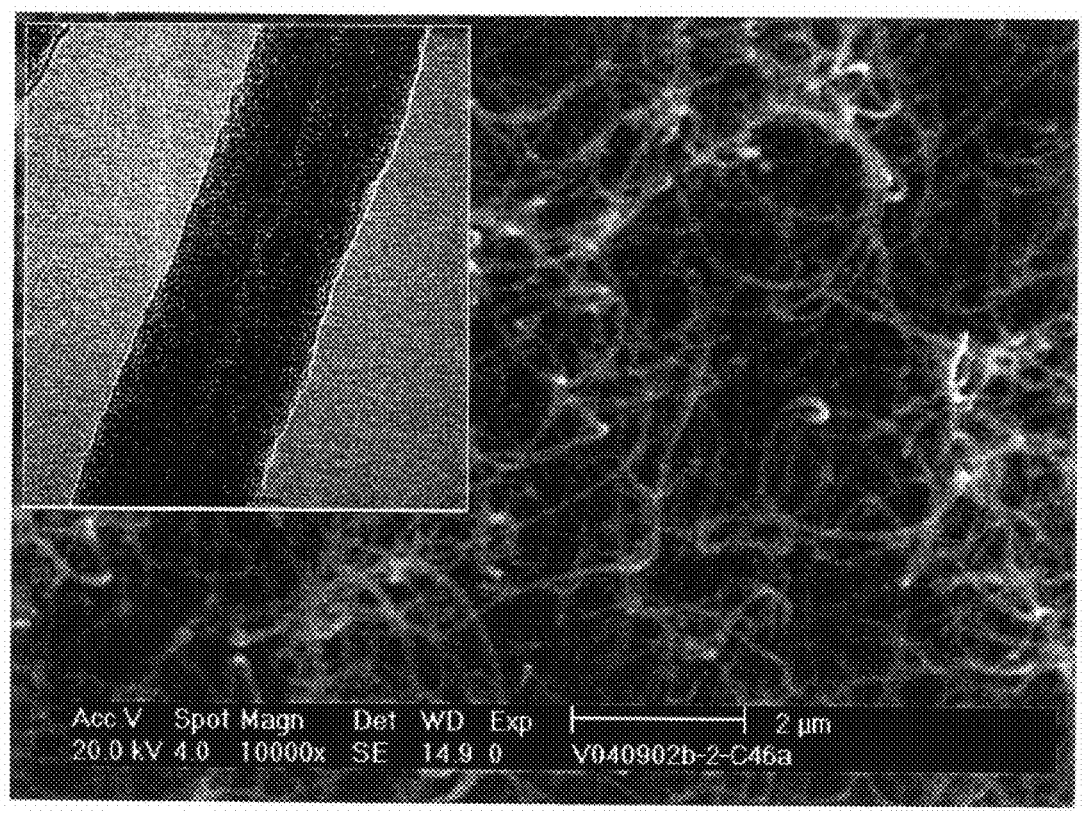
FIG. 1 shows a suitable nanofiber material for use in the plastic composite material according to the invention, magnified up to 10,000 times.
Figure 2:
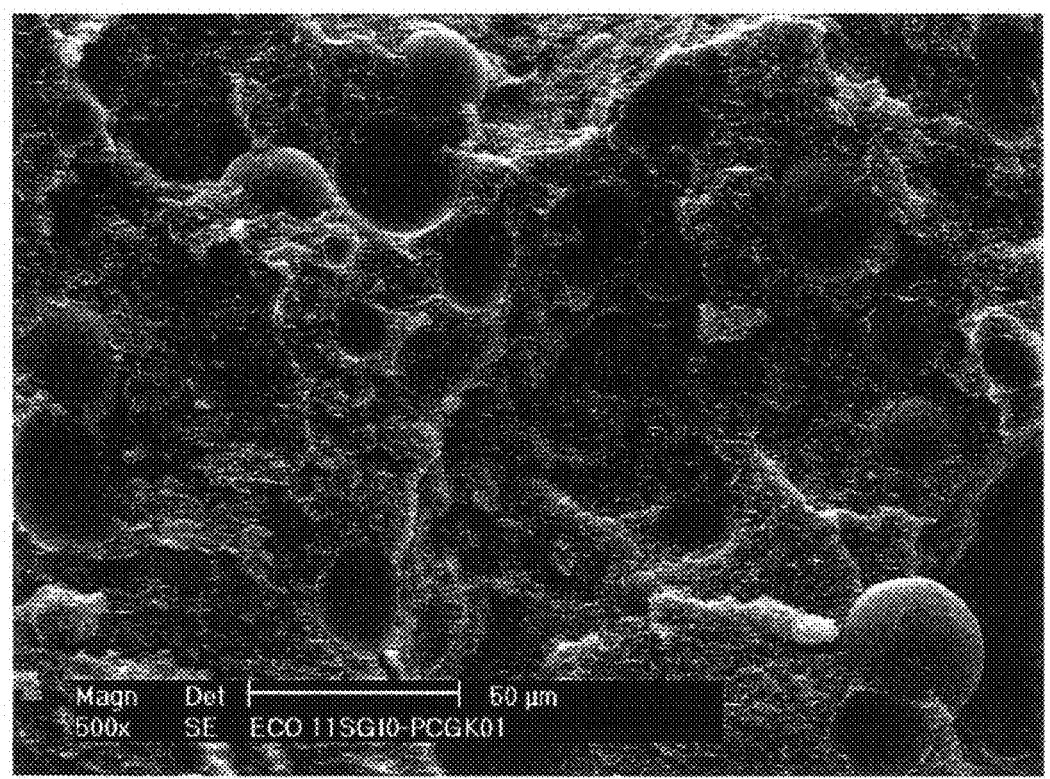
FIG. 2 shows the plastic composite material, magnified 500 times.
Figure 3:
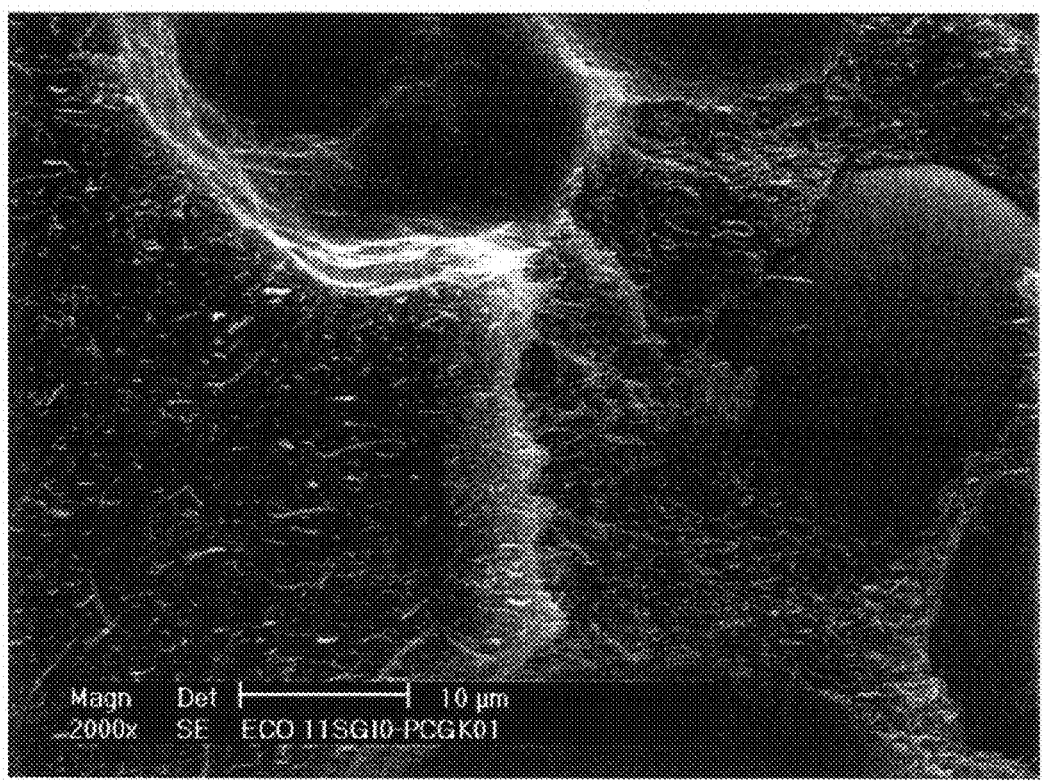
FIG. 3 shows the plastic composite material, magnified 2000 times, with a dearly visible electrically and/or thermally conductive network.
Figure 4:
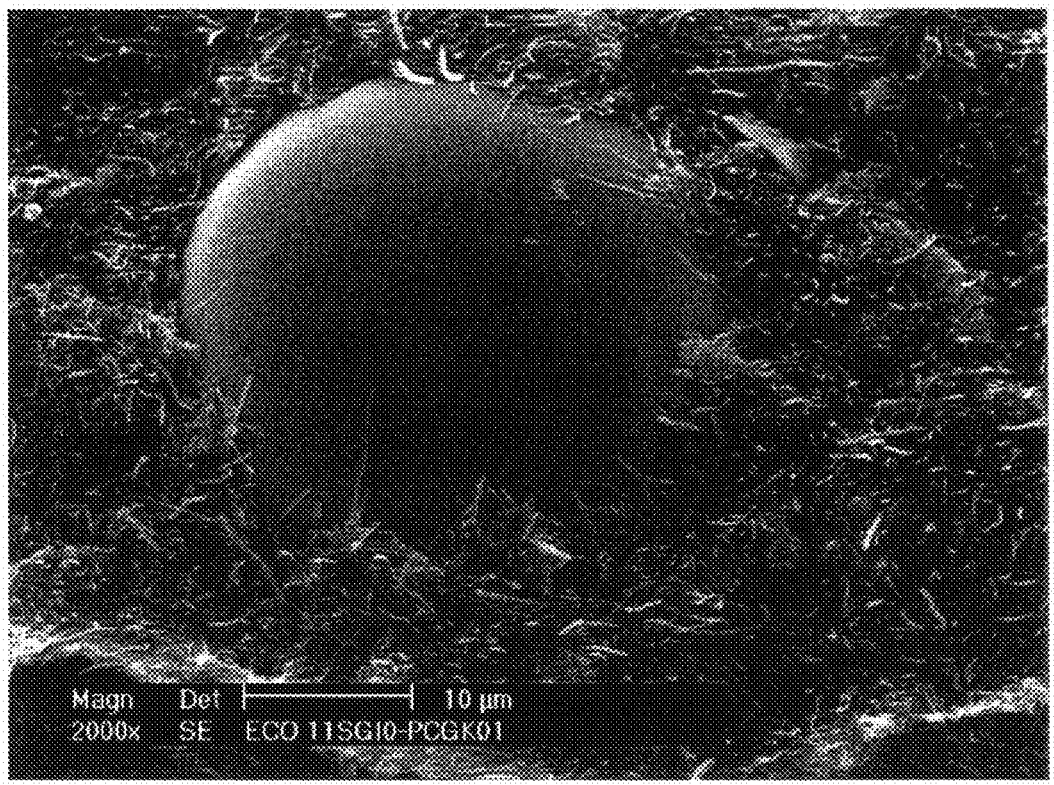
FIG. 4 shows the plastic composite material, magnified 2000 times, in the vicinity of a glass particle.

Suitable nanofibers are, for example, nanofibers with the designation HTF 150 FF, ENF 100 AA, ENF 100 HT offered by Electrovac AG, A-3400 Klostemeuburg, Austria.

Further details of the nanofibers that can be used for the invention are provided in Table 1 below.

TABLE 1

| Nanofiber | Nanofiber type | N2 specific surface | Diameter [nm] | Length [μm] | Thermal conductivity [W/mK] | Electrical resistance [Ohm/cm] | Metal content [wt. %] | Density [g/cm3] |
|---|---|---|---|---|---|---|---|---|
| HTF150FF | AGF | 10-20 | 100-200 | >10 | >600 | $<10^{-3}$ | <0.5 | 1.95 |
| HTF150FF | PSF | 20-30 | 100-200 | >10 | >600 | $<10^{-3}$ | <0.5 | 1.95 |
| HTF150FF | LHT | 15-20 | 100-200 | >10 | >600 | $<10^{-3}$ | <0.5 | >1.95 |
| HTF150FF | HHT | 15-25 | 100-200 | >10 | >600 | $<10^{-3}$ | <0.01 | >1.95 |
| HTF110FF | AGF | 53 | 70-150 | >10 | >600 | $<10^{-3}$ | <0.5 | 1.95 |
| HTF110FF | PSF | 50-60 | 70-150 | >10 | >600 | $<10^{-33}$ | <0.5 | 1.95 |
| HTF110FF | LHT | 43 | 70-150 | >10 | >600 | $<10^{-3}$ | <0.5 | >1.95 |
| HTF110FF | HHT | 41 | 70-150 | >10 | >600 | $<10^{-3}$ | <0.01 | >1.95 |
| ENF100AA | HTE | 80-100 | 80-150 | >10 | >600 | $<10^{-3}$ | <0.5 | 1.98 |
| ENF100AA | GFE | >50 | 80-150 | >10 | >600 | $<10^{-3}$ | <0.01 | 2.17 |

Nanofiber type:
AGF as grown
PSF pyrolytic stripped carbon nanofiber
LHT heated at ~1,000° C.
HHT heated at ~3,000° C.
HTE heated at ~1,000° C. with EVAC
GFE heated or graphitized at ~3,000° C. with EVAC

SUMMARY OF THE INVENTION

The plastic composite material according to the invention is made up of an electrically non-conductive polymer matrix, of an effective concentration of graphite-based particles or nanofiber material, for example carbon nanofiber material, and of particles made of an inorganic silicate material, which can be either solid or essentially solid with a relatively high specific density, or porous or hollow with a reduced specific density. The matrix of the plastic composite material according to the invention contains the nanofiber material for example as reinforcement fibers in an optimum concentration for this purpose.

Nanofiber material according to the invention means nanotubes or nanofibers and also mixtures of nanotubes and nanofibers. The nanofiber material of the invention is preferably a carbon nanofiber material.

The inorganic silicate particles are preferably particles made of glass, preferably bubble-shaped or spherically shaped particles of a microscopic or nanoscopic size, i.e. of a size in the micrometer range and/or in the nanometer range.

Accordingly the following values apply:

| Nanofiber type | heated at |
|---|---|
| HTF 150 FF-LHT | ca. 1000° C. |
| HTF 150 FF-HHT | ca. 3,000° C. |
| HTF 110 FF-LHT | ca. 1,000° C. |
| HTF 110 FF-HHT | ca. 3,000° C. |
| ENF 100 AA-HTE | ca. 1,000° C. |
| ENF 100 AA-GFE | ca. 3000° C. - graphitized |
| ENF 100 HT | ca. 1,000° C. |

The combination of particles with a graphite base or nanofiber material and the inorganic silicate particles of a microscopic or nanoscopic size results in surprising advantages.

For example, the invention makes it possible to reduce the viscosity of the plastic composite material in liquid state, for example with a thermoplastic matrix in melted state, in order to achieve improved flow properties and therefore to create complex workpiece or product geometries, in particular also with very fine structures. Further, the embodiment of the plastic composite material according to the invention reduces the shrinking behavior of complex workpieces or molded parts manufactured from this material, again especially also due to the combination of graphite-based particles or nanofiber material and the inorganic silicate particles of a macroscopic or microscopic or nanoscopic size, which provide for homogeneous heat transfer also with the material or the matrix during hardening and cooling in the manufacture of molded parts.

The embodiment of the plastic composite material according to the invention also enables significant improvement in the inherent stability or permanence especially of complex products, in particular also of thin products or parts of such products that have a length that is significantly greater than the width and that are manufactured by extrusion, injection molding, blow molding, thermal molding or foaming or some other method. It has been shown, for example, that molded parts manufactured with the plastic composite material according to the invention by injection molding with a length of 250 mm, a width or 80 mm and a thickness of only 1.5 mm, exhibit deformation (according to DIN 17014) of only 1.6 to 0.4 mm, which is an improvement of 70-80% as compared with such molded parts with the same dimensions and manufactured by injection molding using conventional plastic composite materials, such as those normally used in the electronics industry.

With the invention it is also possible to achieve significant improvements in the mechanical properties of the plastic composite material and of the products manufactured from this material, in particular, but not exclusively, an improvement in strength, toughness, impact and shock resistance and rigidity. The plastic composite material according to the invention also features improved flame-retardant properties, despite the fact that it contains zero halogen.

The plastic composite material according to the invention also has excellent electrical properties, i.e. it is electrically conductive. With the selection of a suitable composition the plastic composite material according to the invention is therefore suitable as an ESD material, i.e. as an antistatic or electrically dissipative material (e.g. as defined in DIN EN 61340-5-1), for example in electronics or for use of certain products or molded parts in electronics, in particular also for protecting components and modules against static discharges and/or electrical fields. As is known to persons skilled in the art, electrostatic discharges resulting from high electric potential differences in an electrically insulating material due to sparks, breakdowns and high current pulses that occur during such discharges can cause significant damage, especially to electrical or electronic modules and components.

Embodying the material according to the invention as an antistatic or electrically dissipative material makes it possible to prevent such electrostatic discharges in molded parts or products manufactured from the material according to the invention. The electrical conductivity of the plastic composite material according to the invention for these applications is between $10^5$ and $10^{12}$ Ohm.cm due to the corresponding selection especially of the concentrations of nanofiber material and particles with a silicate base and/or glass.

By a corresponding selection of the composition or concentrations of the components of the plastic composite material according to the invention, this material is also suitable for shielding electromagnetic perturbing radiation, for example for the prevention or reduction of an electromagnetic perturbing radiation emitted from an electric or electronic device or vice versa, to shield a device, e.g. an electric or electronic device, against electromagnetic perturbing radiation from the environment. The permissible threshold values for electromagnetic perturbing radiation emitted from an electric or electronic device are regulated by the requirements of the EMC directive described in the new EMC generic standard EN 61000-6. These requirements can easily be fulfilled with a product manufactured using the plastic composite material according to the invention in a suitable design for shielding. The electrical conductivity of the plastic composite material according to the invention for these applications is between $10^0$ and $10^5$ Ohm.cm due to the corresponding selection especially of the concentrations of nanofiber material and silicate-based and/or glass particles.

The plastic composite material according to the invention also features improved thermal conductivity as compared with conventional plastic materials. By selecting a suitable composition of the material or concentrations in particular of nanofiber material and silicate-based and/or glass particles, thermal conductivity in the range between 0.5-2 W/mK° or in the range of 0.2-0.5 W/mK° can be achieved.

The advantages of the plastic composite material according to the invention can therefore be summarized as follows:
- minimum shrinking in injection molding of molded parts
- minimum distortion in injection molding of molded parts
- permanent improvement of the flame-retardant properties and diffusion properties
- easy adaptation of the physical properties, in particular also of the electric and/or thermal properties of the plastic composite material to the requirements of the respective application
- high thermal and electrical conductivity, given a sufficient concentration of nanofiber material
- high specific density with the use of solid silicate-based or glass particles
- high strength
- high dimensional stability of products manufactured from the plastic composite material
- good flow properties, in particular also in injection molding
- optimized thermal stability and resistance
- the plastic composite material contains zero halogen.

In one general embodiment of the invention the matrix consisting of at least one polymer or copolymer, for increasing the electrical and thermal conductivity, etc. contains a high concentration of nanofiber material and/or graphite-based particles, for example in the form of carbon nanofiber material, and glass particles with a high specific density as an additional filler, for example with a density between 2.5 and 2.6 g/cm³. The nanofiber material, the graphite-based particles with and the glass particles are dispersed by mixing in the polymer matrix. In addition to the improved mechanical properties, this plastic composite material also has antistatic properties with significantly improved viscosity in liquid state, simply due to the combination of the additives "nanofiber material/graphite-based particles/glass particles".

According to a further general embodiment of the invention, in addition to the nanofiber material and/or in addition to the graphite-based particles, for example again the form of carbon nanofiber material, the polymer matrix also has glass particles in the form of hollow or porous glass particles in an optimized concentration. These glass particles then have the function of a filler with a low specific density, i.e. with a density of less than 2.5 g/cm³, so that this plastic composite material is especially suitable for applications in which, while maintaining the other advantages of the plastic composite material according to the invention, the lowest possible weight or the lowest possible density is required.

The plastic composite material according to the invention can contain additional additives in the polymer matrix, for example stabilizers, lubricants, waxes, antistatic additives, pigments and also other additives for improving physical properties, for example for improving impact hardness or resistance, for improving the compatibility of the material, for improving the processing properties of the material, etc.

The plastic composite material according to the invention can be processed in diverse manners, for example by extrusion, by injection molding, by blow molding, by thermal molding (plastic deformation) or foaming; other processing methods are also possible. After processing, the respective product features at least some of the above-mentioned improved physical and mechanical properties.

Due to the improved form stability, the plastic composite material according to the invention is especially suitable for the manufacture of complex parts, in particular also very narrow and thin molded parts, i.e. products or molded parts with a length at least in some sections that is significantly greater than the width and thickness. Such molded parts can then be manufactured for example by extrusion, injection molding, blow molding, thermal molding or foaming or also by combinations of these methods or also in some other manner.

In a typical embodiment of the invention a thermoplastic polymer or copolymer is used, which is melted in a suitable machine (e.g. compound machine, mixer, extruder) and then mixed with the nanofiber material, preferably with the carbon nanofiber material, and the glass particles and with any other additives. The entire mixing process is preferably accompanied by degassing, i.e. the mixing process is conducted for example in a slight vacuum in order to prevent degradation or alteration of the polymer matrix, which could have a negative effect on the constancy and fatigue strength or aging resistance of the plastic composite material and the products manufactured from this material.

In a further embodiment of the invention the nanofiber material and/or the graphite-based particles and/or glass particles are mixed in an extruder with the at least one polymer or copolymer forming the matrix.

Regardless of the respective special composition of the plastic composite material according to the invention and/or of its manufacture and/or processing, this material typically contains the nanofiber material in the polymer matrix in a concentration between 1-60 percent by volume in relation to the total volume of the plastic composite material.

Approximately 25 percent by volume of the nanofiber material in the polymer matrix or in the surface coat of the polymer matrix is a sufficient concentration to achieve excellent electrical conductivity while improving the flow properties of the meted polymer material.

Even with a low concentration of nanofiber material of approximately 1 percent by volume, improved antistatic properties can be achieved for the plastic composite material according to the invention and for products manufactured from this material.

What is claimed is:

1. A plastic composite material comprising a polymer matrix with a concentration of a nanofiber material and a concentration of graphite-based particles, wherein the matrix further comprises at least one inorganic filler in the form of silicate-based particles or in the form of glass particles, wherein the composite material exhibits a thermal conductivity in the range between approximately 0.2-0.5 W/mK°, or 0.5-2.0 W/mK°.

2. The material according to claim 1, wherein the inorganic filler consists essentially of silicate-based particles, glass particles, or combinations thereof.

3. The material according to claim 1, wherein the nanofiber material is a carbon nanofiber material.

4. The material according to claim 1, wherein the nanofiber material comprises at least primarily of nanotubes, or at least primarily of nanofibers.

5. The material according to claim 1, wherein the silicate-based particles are solid or essentially solid particles, with a specific density between 2.5 and 2.6 g/cm$^3$.

6. The material according to claim 1, wherein the silicate-based particles are porous or hollow particles with a specific density below 2.5 g/cm$^3$.

7. The material according to claim 1, wherein the silicate-based particles are bubble-shaped or spherically shaped particles.

8. The material according to claim 1, wherein the silicate-based particles are coated with an electrically or thermally conductive material, a metal material, or silver.

9. The material according to claim 1, wherein the concentration of nanofiber material is between 1.0 and 60.0 percent by volume in relation to a total volume of the composite material.

10. The material according to claim 1, wherein the concentration of nanofiber material is 25 percent by volume in relation to a total volume of the composite material.

11. The material according to claim 1, wherein at least a majority of the silicate-based particles have a size that is between 10 and 40 μm.

12. The material according to claim 1, wherein a concentration of silicate-based particles is between approximately 1-30 percent by volume of the composite material.

13. The material according to claim 1, wherein the polymer matrix further comprises additional additives, stabilizers, lubricants, antistatic additives or additives that improve impact strength.

14. The material according to claim 1, wherein the polymer matrix consists of at least one polymer or copolymer, or a thermoplastic polymer or copolymer, or at least one duroplastic or synthetic resin.

15. The material according to claim 1, wherein a concentration of silicate-based particles in the polymer matrix is selected so that products or molded parts manufactured from the composite material exhibit reduced distortion as compared with conventional plastic composite materials, a 70-80% reduction in distortion.

16. The material according to claim 1, wherein the material exhibits electrical conductivity in the range between approximately $10^5$-$10^{12}$ Ohm.cm, or between approximately $10^0$-$10^5$ Ohm.cm.

17. The material according to claim 1, wherein the composite material is an antistatic or electrically dissipative material with electrical conductivity in the range between approximately $10^5$-$10^{12}$ Ohm.cm.

18. The material according to claim 1, wherein the composite material is an electrically conductive material for shielding electromagnetic radiation with electrical conductivity in the range between approximately $0^0$-$10^5$ Ohm.cm.

19. The material according to claim 1, wherein in the polymer matrix between the silicate-based particles, an electrically or thermally conductive network or a network that significantly defines the physical properties of the material is formed by the nanofiber material.

20. A method for manufacturing a plastic composite material according to claim 1, wherein the incorporation of the nanofiber material and the silicate based particles into a polymer matrix is accomplished by mixing, and wherein the mixing takes place with constant degassing.

21. The method according to claim 20, wherein the mixing of the nanofiber material and of the silicate-based particles or glass particles takes place in a heated mixer.

22. The method according to claim 20, wherein the mixing is continuous or discontinuous at least part of the time.

23. The method according to claim 20, wherein the addition of the nanofiber material and of the silicate-based particles to the polymer matrix forming the matrix takes place in an extruder.

* * * * *